Sept. 13, 1955 C. G. VIGGERS 2,717,697
MEANS FOR CONTROLLING THE SLUDGE FLUSHING
OF A FLUID TREATING PLANT
Filed Aug. 17, 1950
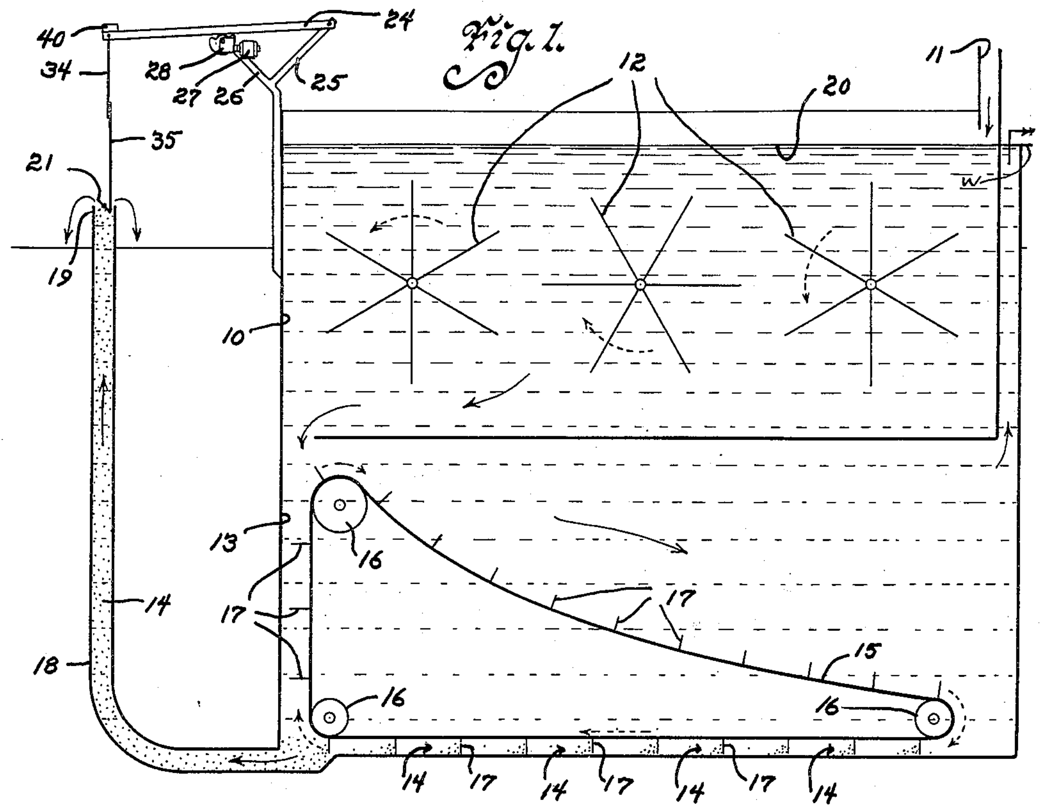
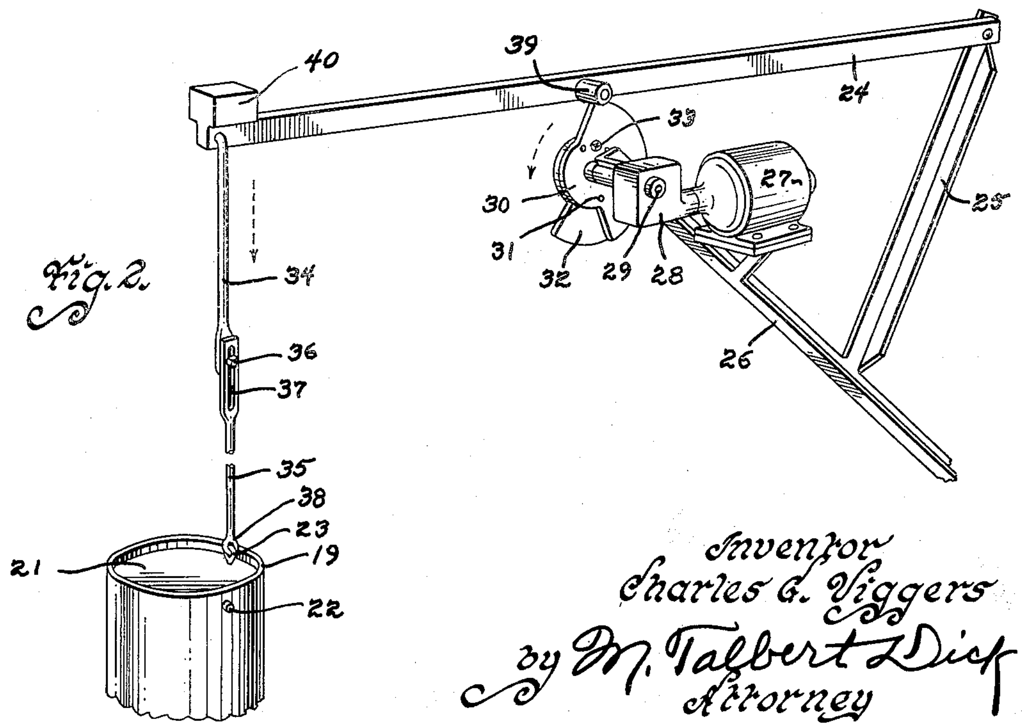
Inventor
Charles G. Viggers
by M. Talbert Dick
Attorney United States Patent Office 2,717,697
Patented Sept. 13, 1955

2,717,697

MEANS FOR CONTROLLING THE SLUDGE FLUSHING OF A FLUID TREATING PLANT

Charles G. Viggers, Des Moines, Iowa

Application August 17, 1950, Serial No. 179,927

3 Claims. (Cl. 210—55)

My invention relates to the art of controlling the flushing action in fluid processing plants of the type wherein a sludge is precipitated out of the fluid and falls to the bottom of a settling tank from where it is collected mechanically and presented to a flushing conduit and the pressure head formed by the fluid being processed forces the sludge out the flushing flow sludge discharge pipe. Specifically, my invention is a method and a valve means for effecting my method that intermittently opens the discharge pipe to control this flushing action automatically.

The removal of sludge from fluid treating plants wherein chemicals are mixed with the fluid to precipitate certain elements to the bottom of a settling basin, the sludge formed on the bottom of the basin was discharged by a continuous flow of the fluid in process. This flow was controlled by a sliding valve known in the art as a turtle-neck valve. The valve consisted of two pipes, one of which was slidably arranged within the other and provided with a means for adjusting the position of these two pipes in relation to each other. The proper adjustment of the pipe that was moveable was determined by the pressure head formed by the fluid in process. When this level was high, the slidable inner pipe was raised to a location approaching the surface of the fluid in the settling basin. When the fluid level became low, the inner slidable pipe had to be lowered in order to retain its same relative position with respect to the fluid level within the settling basin. This system of flushing the sludge from a fluid treating settling basin has several inherent shortcomings.

As a concrete illustration, let us take the example of a water softening plant in which chemicals are mixed with the water to precipitate out the mineral salts. In a typical plant for a city of approximately 150,000 population, hundreds of thousands of gallons of water are used daily merely to flush sludge. In order to reduce the quantity of water dissipated in this flushing work, the operators of the typical system using the turtle-neck valve have tried regulating the flow to a minimum quantity by keeping the turtle-neck at a setting only slightly below the level of the water in the settling basin. Experience taught the operators of the standard system that an attempt to regulate the flow of water through the sludge discharge pipe to a rather close margin with respect to the pressure head at any given moment, caused further, and even greater difficulties. It was found for example that the adjustment of the valve to a high position for a high water head did reduce the water flow. Any noticeable change in the water level, however, would immediately drop the pressure head far enough to shut off the sludge discharge flow all together. When such a situation occurred at a time when the system was not under close surveillance by experts who would reset the valve, the result was a jammed or clogged sludge pipe which required expensive repair work to be done. The cost of this repair work has been found to exceed the value of the water saved by a close valve setting. When such a system is in actual operation, therefore, it has been found wise from a total operational point of view, to open the turtle-neck valve to the full open position, i. e., with the slidable inner sleeve in its lowest possible position and let the fluid flow vary with the changes in the pressure head developed in the basin. Since there are at least parts in a day when the pressure head is relatively high, there are of course times when the water flow through the sludge discharge pipe is excessive. It has been estimated that as many as one million gallons of water in a day were used to flush the sludge from the water softening basin for a single mid-western city of a population of about 150,000. I discovered by experiment, however, that an intermittent flushing period of relatively short duration would be satisfactory.

In view of the difficulties and shortcomings of the prior art noted above, therefore, and the fact that an intermittent flushing period would be satisfactory, it is the purpose of my invention to provide a method and a valve means for controlling a fluid treating plant flushing system that reduces the amount of fluid used in flushing out accumulated sludge. It is a further purpose of my invention to provide a sludge flushing control valve that is automatically open and closed in a powered, timed cycle. It is yet a further object of my invention to provide such a sludge flushing control valve that may have the open and closed portions of its powered, timed cycle varied with respect to each other. It is still a further object of my invention to provide such a sludge flushing control valve that may be adjusted to permit a constant mild flow of fluid if desired. It is a still further object of my invention to provide such a sludge flushing control valve that is durable in use, inexpensive to manufacture and trouble free in operation.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a diagrammatic side view of a fluid processing plant such as that in which my valve may be used to advantage, Fig. 2 is an enlarged perspective view of my valve and its controlling mechanism.

Referring to the drawings, I have used the numeral 10 to designate the mixing basin of a typical water softening installation. Hard water enters the mixing basin through the intake port 11 as shown by the arrow in that member. Once water is in the mixing basin, chemicals are added which tend to form a precipitate that is of a greater specific gravity than water and the paddle wheels designated 12 stir the water with the chemicals to insure better reaction. The treated water thus mixed with the chemicals and with the precipitate forming a quasi-colloidal solution follows the arrows into the lower basin 13, known in the art as a settling basin. In the settling basin the water is relatively static and the mineral salts 14 formed by the reaction of the chemicals with the mineral salts in the hard water precipitate to the bottom of the settling basin, a sludge scraper in the form of an endless conveyor designated 15 mounted on the rotating driving and guiding members designated 16 is constantly in motion from a source of power (not shown) outside the settling basin. This endless conveyor has the scraper blades designated 17 secured to its outside, which blades move across the bottom of the settling basin in the direction shown by the arrows and each scraper carries a small deposit of the precipitated sludge with it across the bottom of the settling basin to a sludge discharge pipe. A sludge collector is frequently used at one end of the basin to collect the sludge moved to that end to a particular area of the basin such as one corner but for the purpose of my invention this detail is not important and has been omitted. Of course in all such plants, the water is maintained at a predetermined level by an overflow wier represented diagrammatically at W, and shown a little more typically in Fisher Patent No. 2,110,721, for example.

Thus far, I have merely described a more or less standard form of fluid treating plant and claim no part of the foregoing as my invention except in combination with novel features to be described. Similarly, the sludge discharge flushing flow pipe designated by the numeral 18 extends upwardly to its free end designated by the numeral 19 which is some distance below the water level designated 20 in the settling basin. It was in this sludge discharge pipe that the old sliding turtle-neck valve used to be inserted. I now come to a particular description of my sludge flushing discharge flow pipe control valve which is my invention.

In the end 19 of the sludge pipe I mount a butterfly valve designated 21 that is pivoted on the rod 22 extending either through holes in the pipe or into appropriate sockets in a collar fitted inside the pipe or in any other appropriate manner. A butterfly valve is not essential, but is merely the simplest known balanced pressure valve which permits a relatively slight force to operate it. The valve 21 has a means provided on it such as the eye 23 or the like to permit its connection to an operating mechanism. One simple form of operating mechanism is shown here for purposes of illustration which has been tried in actual installation and found to be quite satisfactory. A lever arm desgnated 24 is pivotally or hingedly secured to a fixed fulcrum such as the support arm 25 or the like which together with the support arm 26 forms the main supporting frame for a power source such as electric motor 27 or the like, which through a gear box designated 28 drives a shaft 29 at a fixed and appropriate rate of speed. Rigidly secured to the shaft is a cam member 30, comprising two semi-circles joined at their flat sides and one having a much smaller diameter than the other as is clearly shown in Fig. 2. A series of holes 31 extend in a semi-circle in one-half of the cam. A second cam 32 formed identically like the first is freely rotatable on the shaft 29, but may be secured in a fixed relation to it by means of the bolt and nut assembly 33 or some similar securing means extending through an appropriate one of the holes 31 and an appropriate hole in cam 32. Thus by moving the bolt 33 to different locations in the cam 30, the relative location of cam 32 may be changed with respect to cam 30 to vary the length of the low spot on the cam assembly made up of the cam 30 and 32 when rigidly secured together. By changing the positions of these two cams in their relation to each other, therefore, the relative length of the open and closed phases of the operational cycle may be varied. The connecting rod made up of the two portions 34 and 35 which are adjustably secured together by the nut and bolt assembly 36 sliding in the slot 37 when loosened or holding the two members rigid in respect to each other when tightened. The member 35 has a hook loop 36 formed in its lower end to engage the eye member of the valve 21. A means for reducing the friction of the arm 24 riding on cams 30 and 32 may be provided such as the roller 39. Positive following action for arm 24 is supplied by the weight 40 or an equivalent such as the spring or the like.

In operation, once the operational cycle has been determined the driving gear may be adjusted to rotate the cam members 30 and 32 at the proper speed as for example, one complete revolution in one minute. During the rotation of the cam members, the roller 39 rides on the cam surface and carries the lever arm 24 with it. The weight 40 causes the lever arm and roller to follow closely the cam surface and in the position of the mechanism shown in Fig. 2, holds the butterfly valve 21 in a closed position. Continued rotation of the cam brings the roller to the low spot on the cam and permits the lever arm and weight to move the butterfly valve to an open position by moving the end of the valve connected to connecting rod 35 downwardly. It is important to have the shoulder wall of the cam member 32 extend substantially in a radial direction as shown in Fig. 2. When the cam is formed in this manner, the valve 21 will open suddenly, since the cam follower roller 39 falls all the way from the high to the low point of the cam once it starts falling. A still furter continued rotation of the cam closes the butterfly valve again as shown in Fig. 2. In this cycle of operation, it will be noticed that the valve is closed a much longer period of time than it is open. A very satisfactory setting of the cam has been found to be one in which the valve is open approximately twenty per cent of the time. The balance of the time the valve may be shut clear off or by adjusting the combined length of the connecting rods 34 and 35 by means of the nut and bolt assembly 36 and slot 37, the valve may be set to remain open slightly even during the portion of the cycle illustrated in Fig. 2. This position of the valve known as a cracked position may be used in some cases where the sludge of the fluid being treated has a tendency to pack and not remain in solution sufficiently to flush easily during the flush periods. In any event, the amount of fluid used for flushing as compared to that used in the old turtle-neck system may be enormously reduced. In one plate in which this system was tried, the amount of flushing fluid used was reduced by eighty per cent. Nevertheless, very satisfactory flushing results are obtained for the reason that during the brief flushing period, a high pressure is used for flushing as the flushing valve is in a wide open position.

It should be obvious from the foregoing that I have invented a flushing control valve that is vastly superior to the systems heretofore known. It should also be noted that the system is an extremely simple one and therefore should be relatively trouble free. While I have described my valve system in connection with a water softening plant, it may be used in other fluid treating plants to equal advantage such as a sewage disposal plant to mention but one. It is felt that anyone skilled in the art could duplicate my device and its accompanying excellent results from the disclosures made in the drawings and specification.

Some changes may be made in the construction and arrangement of my method of and means for controlling the sludge flushing of a fluid treating plant without departing from the real spirit and purpose of my invention, and it is my intention to cover by my claims, any modified forms of structure or use of mechanical equivalents which may be reasonably included within their space.

I claim:

1. A liquid processing plant including a settling tank for settling from a liquid solids in the form of a sludge, outflow means in said tank for maintaining liquid in the tank at a given level, a sludge flow-off pipe communicating with said tank near the bottom thereof, extending upwardly, and communicating with the atmosphere at a level near but moderately below the liquid level maintained in this tank by said outflow means; said tank having means for concentrating the settled sludge adjacent said pipe; a valve of a quick-acting type capable of alternately opening and closing said pipe positioned near the outlet of said pipe, and means having a cycle approximately as short as one minute for opening and closing said valve in a regular timed cycle with a quickly-complete opening action to provide a maximum flow passage substantially as flow begins.

2. A liquid processing plant including a settling tank for settling from a liquid solids in the form of a sludge, outflow means in said tank for maintaining liquid in the tank at a given level, a sludge flow-off pipe communicating with said tank near the bottom thereof, extending upwardly, and communicating with the atmosphere at a level near but moderately below the liquid level maintained in this tank by said outflow means; said tank having means for concentrating the settled sludge adjacent said pipe; a butterfly valve rotatably mounted in said flushing flow pipe near its outlet, and a constantly rotating cam for alternately opening and closing said valve at frequent intervals in a regular timed cycle, the cam dwell of largest thrust terminating in a precipitous drop to the cam dwell of minimum thrust, to provide quick actuation of the valve.

3. A liquid processing plant in accordance with claim 2, in which a follower biased against the cam is coupled to the valve to open the valve as the follower moves suddenly under the influence of the bias to the smaller portion of the cam.

References Cited in the file of this patent

UNITED STATES PATENTS

| | | |
|---|---|---|
| Re. 21,536 | Lund | Aug. 20, 1940 |
| 833,554 | Schwoll | Oct. 16, 1906 |
| 1,119,472 | Taussig | Dec. 1, 1914 |
| 1,197,342 | Castellazzi | Sept. 5, 1916 |
| 1,227,107 | Blomfield | May 22, 1917 |
| 1,534,145 | Stedman | Apr. 21, 1925 |
| 1,608,091 | Eisenhauer | Nov. 23, 1926 |
| 1,610,725 | Andrews | Dec. 14, 1926 |
| 1,661,676 | Norquist | Mar. 6, 1928 |
| 1,751,689 | Enz et al. | Mar. 25, 1930 |
| 1,828,126 | Brown | Oct. 20, 1931 |
| 2,110,721 | Fischer | Mar. 8, 1938 |
| 2,130,417 | Butzler | Sept. 20, 1938 |
| 2,233,448 | Fischer | Mar. 4, 1941 |
| 2,240,182 | Guldner, Jr. et al. | Apr. 29, 1941 |
| 2,243,826 | Nielson et al. | May 27, 1941 |
| 2,317,847 | Duden | Apr. 27, 1943 |
| 2,593,936 | Koch | Apr. 15, 1952 |

FOREIGN PATENTS

| | | |
|---|---|---|
| 378,638 | France | Aug. 17, 1907 |

OTHER REFERENCES

"Hydraulics and its Applications" by Gibson, 4th edition, pages 222 to 244.